O. L. LEWIS.
STEERING DEVICE AND BRAKE FOR TRACTORS.
APPLICATION FILED OCT. 11, 1920.

1,403,258.

Patented Jan. 10, 1922.
3 SHEETS—SHEET 3.

INVENTOR.
Otto Leroy Lewis,
BY
ATTORNEYS.

UNITED STATES PATENT OFFICE.

OTTO LEROY LEWIS, OF HOUSTON, TEXAS.

STEERING DEVICE AND BRAKE FOR TRACTORS.

1,403,258.  Specification of Letters Patent.  Patented Jan. 10, 1922.

Application filed October 11, 1920. Serial No. 416,318.

*To all whom it may concern:*

Be it known that I, OTTO LEROY LEWIS, a citizen of the United States, and a resident of Houston, in the county of Harris and State of Texas, have invented certain new and useful Improvements in Steering Devices and Brakes for Tractors, of which the following is a specification.

My present invention relates generally to the steering and stopping of tractors, more particularly those machines whose nature is such as to make it extremely difficult and laborious to manually steer and apply brakes. The invention is applicable to any machine of a nature permitting of controlling the direction of movement of the vehicle by disconnecting the source of power from the wheel or wheels at one side while those at the other side continue to rotate under power, either with or without an additional check against rotation of the wheels at that side which has been disconnected.

The steering thus naturally allies itself with braking means which may also be used to retard the motion of the tractor on downward grade or when it is desired to stop, the brakes being applied in the latter instance after the power has been released from all drive wheels.

The primary object of the invention is the provision of a simple convenient mechanism of the above type capable of control by flexible lines or straps in the hands of the operator and applicable to various types of tractors, especially front wheel drive tractors of the type described and claimed in my copending application 399,599, filed July 28, 1920 in connection with which I will hereinafter describe and illustrate the present improvements.

It is a well known fact that the manual labor necessary to operate the ordinary hand wheel steering devices of tractors of various types now in use is quite fatiguing and my present invention aims to relieve the operator of the arduous portion of this work, leaving the control of a power steering device in his hands.

Another object of my invention is to provide a steering device the control of which may be accomplished from a drawn implement or vehicle, such as a grain binder, and the description to follow will include the means by which this may be accomplished.

Figure 1:
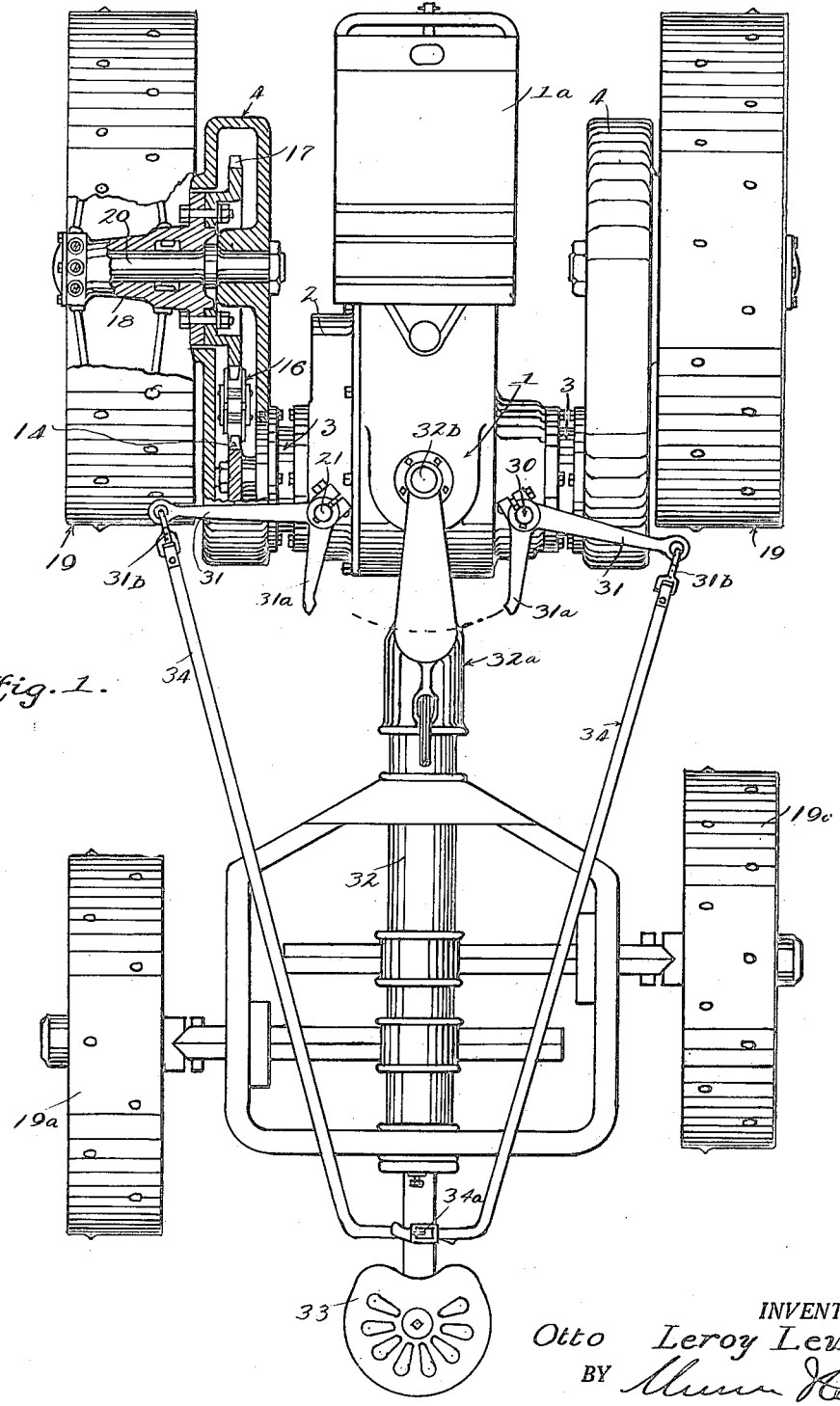
Figure 2:
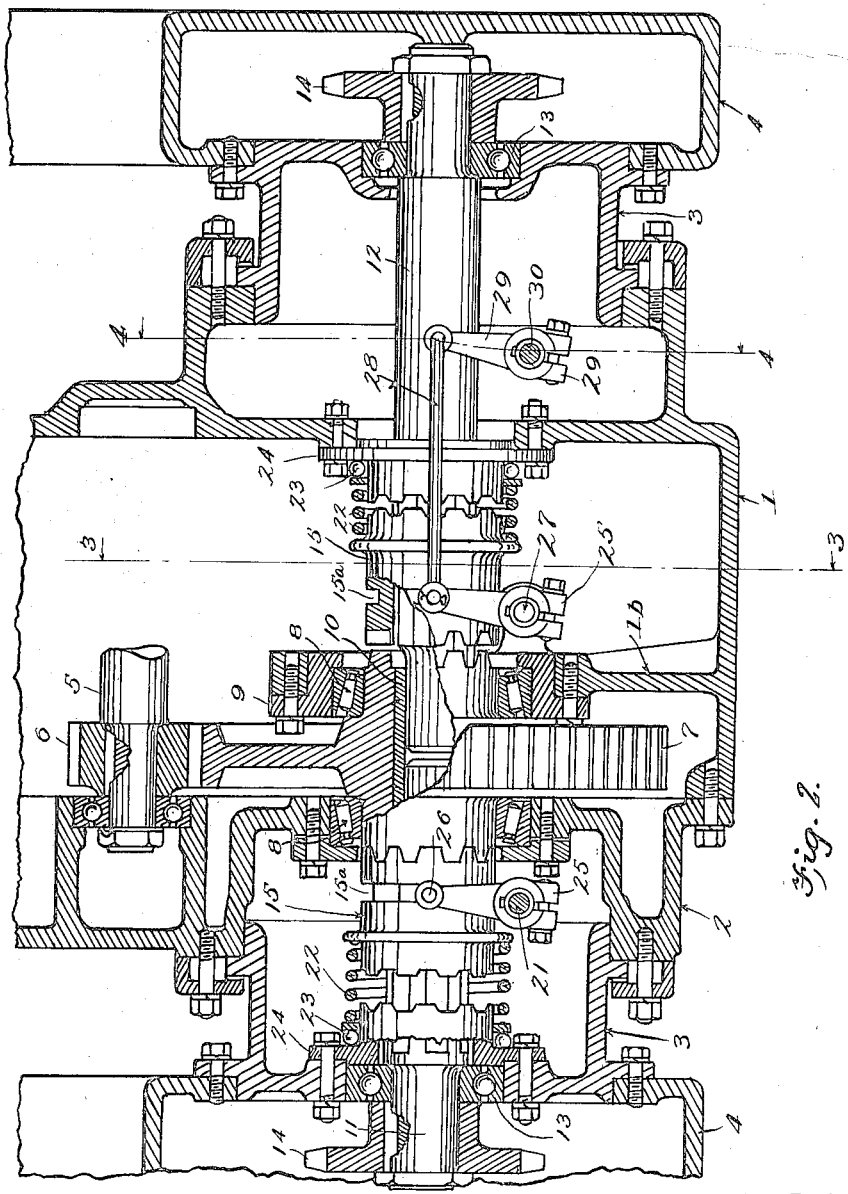
Figure 3:
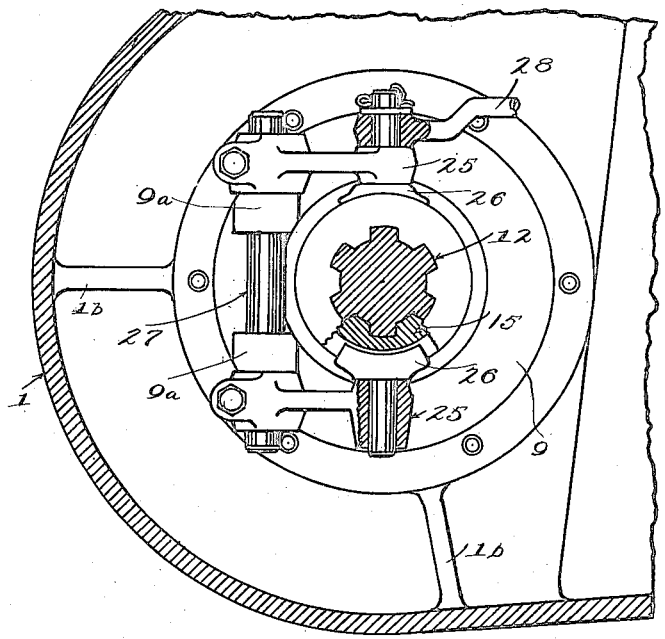
Figure 4:
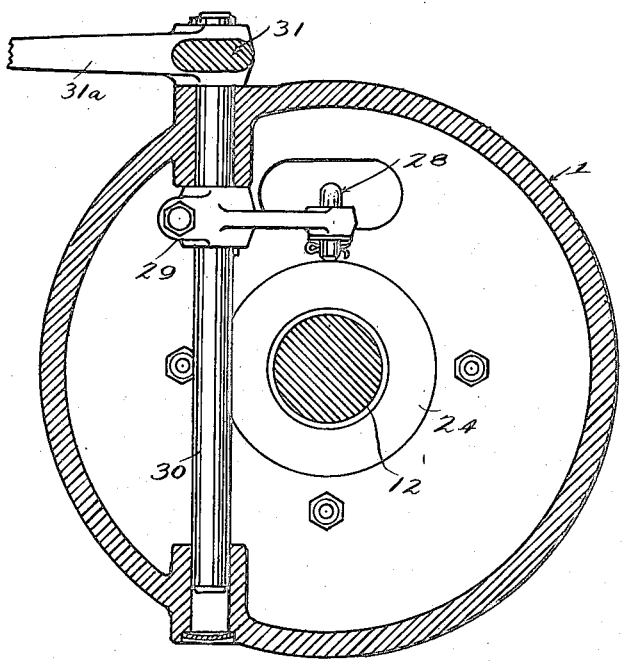

In the accompanying drawings illustrating my present invention and forming a part of this specification, Figure 1 is a top plan view of a tractor of the type shown in my copending application before mentioned, to which the present invention has been applied, parts being broken away and in section to show the wheel driving connections at one side, Figure 2 is an enlarged horizontal section through the gear casing taken in a plane along the coaxial wheel driving shafts, Figure 3 is a vertical section taken substantially on line 3—3 of Figure 2, and Figure 4 is a similar view taken substantially on line 4—4 of Figure 2.

Referring now to these figures, I have shown in Figure 1 a tractor of the type described and claimed in my copending application above referred to, including as it does a gear housing 1 at the rear of a forward support and housing 1ᵃ for the motor. The front wheels are shown at 19, and the rear wheels at 19ᵃ, the latter being disposed at opposite sides of a frame including a central longitudinal member 32 at the forward end of which is a steering yoke 32ᵃ, with respect to which the gear housing 1 is shiftable for steering purposes, with the front wheels, upon pivots 32ᵇ.

The gear housing 1 has a cover plate 2 at one side and rotatably supports laterally projecting tubular distance pieces 3, to the outer ends of which I securely fasten the front drive wheel supports 4.

Power is transmitted from the motor through any suitable clutch and speed reducing gears to a shaft 5 shown in Figure 2, having a pinion 6 in mesh with an enlarged gear 7.

No differential is required for the successful operation of this invention, and gear 7 has a laterally extended hub mounted at opposite sides within bearings 8, one of which is installed in the cover plate 2 and the other of which is supported within a ring 9 bolted to a bracket 1ᵇ in the gear housing 1.

The hub of gear 7 is fitted with an internal bushing 10 forming a pilot bearing for the inner adjacent ends of the two laterally projecting axially alined front wheel drive shafts 11 and 12 whose outer ends are supported in bearings 13 and provided with drive sprockets 14 for connection by means of sprocket chains 16 with sprocket wheels 17 secured to the hubs 18 of the front wheels 19, each of the latter of which rotates upon a supporting shaft or spindle secured through its support 4 which also forms a housing for the driving means, as clearly shown in Figure 1.

By referring again to Figure 2 it will be noted that clutch teeth are milled in both ends of the hub of gear 7, these teeth being engageable by similar teeth cut in sliding collars 15 at one end. These collars are splined upon the wheel drive shafts 11 and 12 at opposite sides of the gear and each has an annular groove 15$^a$ so that through the means to be presently described they may be independently shifted into and out of engagement with the hub of gear 7. When the clutch teeth of the collars 15 and the gear hub are in mesh it is obvious that rotation of the gear wheel 7 is transmitted through the shafts 11 and 12 to the front drive wheels 19 and it is equally obvious that when the collars 15 are withdrawn from engagement, the driving connections are broken. Thus either or both of the drive shafts 11 and 12 may be connected or disconnected by shifting the respective collar into and out of meshed position.

Further referring to Figure 2 it will be noted that the faces of the clutch teeth are beveled, forming tapering teeth with the smaller ends outermost so that the driving pressure thus has a tendency to disengage the clutches, making the clutch collars easy to shift to disengaged position while the machine is under load. This would be very difficult if the teeth were cut with faces normal to the line of pressure and I propose to meet the ideal condition in practice as to this feature by arranging the bevel of the teeth so that the tendency to disengage under load exactly counterbalances the frictional resistance to movement of the clutch collars.

In the normal driving position, the clutch collars 15 are held in meshed or engaged position by springs 22, the thrust of which is taken up by thrust bearings 23 resting against brake hubs 24, the latter of which surrounds the shafts 11 and 12 in spaced relation and at points outwardly beyond the clutch collars 15. Around the inner ends of these brake hubs 24 are shallow sharply tapering teeth complementing similar teeth around the outer ends of the clutch collars 15 so that continued movement of either of these clutch collars in an outward direction after disengagement of the same from the hub of gear 7 will cause engagement thereof with the respective brake hub. It is thus obvious that movement of either or both of the drive wheels may be checked after disengaging the same from the source of power.

Rearwardly of the two clutch collars 15 are upright shafts 21 and 27, each having forwardly projecting arms 25 securely fastened thereto and provided with shoes 26 at their free ends disposed in the annular grooves 15$^a$ of the clutch collars so that upon rotation of the shafts 21 and 27, the clutch collars will be shifted.

The shaft 21 at the left is extended upwardly through the cover plate 2 of the gear housing and is secured to a laterally projecting controlling arm 31, while the shaft 27 at the right is located wholly within the gear housing 1 and has one of its arms 25 connected by a link or connecting rod 28 with a similar arm 29 of an upright shaft 30, the latter projecting upwardly through the gear housing and having an external laterally projecting controlling arm 31 similar to the arm of the shaft 21.

The outer ends of the controlling arm 31 are apertured for the reception of snap hooks 31$^b$ at the forward ends of guide reins or straps 34 so that movement of the arms may be brought about from the rear driver's seat 33, the rear ends of the reins or straps being connected by a buckle 34$^a$ which provides for the reception of extension reins or straps if the control is to be effected from a drawn or trailing vehicle such as a grain binder and the like.

Thus by virtue of this construction it is obvious that when the right hand rein or strap 34 is pulled the right hand clutch collar 15 is withdrawn, thus disconnecting the right hand front drive wheel so that continued driving of the left hand front wheel will tend to guide the machine to the right. As this action takes place the forward portion of the machine swings on the pivots 32$^b$. Should however the operator attempt to cramp the vehicle too greatly in its turning, one of the rearwardly projecting stop arms 31$^a$, with which each of the controlling arms 31 is provided, will come into engagement with the steering yoke 32$^a$ previously mentioned and the result will be to throw the previously released clutch collar 15 in the opposite direction and again into clutched position.

It becomes obvious from the foregoing that the clutch collars may be independently or simultaneously released and that the vehicle may be allowed to drift on a down grade without the necessity of operating the engine clutch and may at the same time be retarded by pulling rearwardly upon the reins or straps 34 until the freed clutch collars are engaged at their outer ends with the brake hubs 24.

Owing to this construction I do away with the necessity for a differential gearing and at the same time accomplish the objects first above stated in a simple, effective manner.

I claim:

1. A tractor having side drive wheels and a pivot turnable gear casing at opposite sides of which the wheels are supported, a pair of axially alined shafts in said casing operatively connected at their outer ends to the wheels, clutch collars splined on the said shafts adjacent to their inner ends, power connections including a driven member within which the inner ends of the shafts are journaled, said driven member having clutch faces at opposite sides engageable by said clutch collars, springs for shifting the clutch collars into engaged position, levers having connections for shifting the clutch collars to disengaged position, and flexible controlling connections leading from said levers.

2. A tractor having a frame including a pivot yoke, a gear housing turnably mounted in the pivot yoke, drive wheels at opposite sides of and supported from the gear housing, a pair of axially alined shafts in the gear housing operatively connected at their outer ends to the wheel, power connections for driving the said shafts including a driven member having a hub in which the inner ends of said shafts are journaled, provided with side clutch faces, spring controlled clutch collars splined on said shafts and having clutch faces normally held in engagement with the clutch faces of said driven member, and connections leading externally of the gear housing for independently shifting the said clutch collars against the tension of their springs.

3. A tractor having a frame including a pivot yoke, a gear housing turnably mounted in the pivot yoke, drive wheels at opposite sides of and supported from the gear housing, a pair of axially alined shafts in the gear housing operatively connected at their outer ends to the wheel, power connections for driving the said shafts including a driven member having a hub in which the inner ends of said shafts are journaled, provided with side clutch faces, stationary brake members around the shafts within the housing, in spaced relation to the said driven member and having clutch faces, clutch collars splined on the shafts between the driven member and said brake members and having clutch faces at opposite ends to cooperate with the clutch faces of the driven member and the said brake members, springs engaging the said clutch members to shift the same in one direction, and connections leading externally of the gear housing for shifting the clutch collars against the tension of said springs.

4. A tractor having a frame including a pivot yoke, a gear housing turnably mounted in the pivot yoke, drive wheels at opposite sides of and supported from the gear housing, a pair of axially alined shafts in the gear housing operatively connected at their outer ends to the wheel, power connections for driving the said shafts including a driven member having a hub in which the inner ends of said shafts are journaled, provided with side clutch faces, spring controlled clutch collars splined on said shafts and having clutch faces normally held in engagement with the clutch faces of said driven member, and connections leading externally of the gear housing for independently shifting the said clutch collars against the tension of their springs, said connections including external levers and flexible control connections extending from the said levers.

5. A tractor having a frame including a pivot yoke, a gear housing turnably mounted in the pivot yoke, drive wheels at opposite sides of and supported from the gear housing, a pair of axially alined shafts in the gear housing operatively connected at their outer ends to the wheel, power connections for driving the said shafts including a driven member having a hub in which the inner ends of said shafts are journaled, provided with side clutch faces, spring controlled clutch collars splined on said shafts and having clutch faces normally held in engagement with the clutch faces of said driven member, and connections leading externally of the gear housing for independently shifting the said clutch collars against the tension of their springs, said connections including external levers and flexible control connections extending from the said levers, the said levers having angular arms engageable with the pivot yoke upon acute turning movement to shift the levers toward normal position after actuation.

6. A tractor having side drive wheels, a driven member having side clutch faces, axially alined shafts operatively connected to said wheels, clutch collars splined on said shafts and independently shiftable into and out of engagement with the clutch faces of said driven member, springs normally holding said collars in engagement with the driven member, stationary brake members having clutch faces into engagement with which said collars are shiftable when moved away from the driven member and means for actuating the clutch collars.

7. A tractor having side drive wheels, a driven member having side clutch faces, axially alined shafts operatively connected to said wheels, clutch collars splined on said shafts and independently shiftable into and out of engagement with the clutch faces of said driven member, stationary brake members having clutch faces into engagement with which said collars are shiftable when moved away from the driven member and means for actuating the clutch collars, said clutch collars and said clutch faces of the driven member and brake members having relatively engaging bevel teeth and said teeth of the driven member and the coacting teeth of the collars being of greater depth than the coacting teeth of the brake members and clutch collars.

OTTO LEROY LEWIS.